United States Patent
Hiromatsu

[11] Patent Number: 5,880,859
[45] Date of Patent: Mar. 9, 1999

[54] IMAGE READING APPARATUS

[75] Inventor: Kenji Hiromatsu, Kyoto, Japan

[73] Assignee: Dainippon Screen Mfg. Co., Ltd., Japan

[21] Appl. No.: 636,505

[22] Filed: Apr. 25, 1996

[30] Foreign Application Priority Data

Apr. 28, 1995 [JP] Japan ................................. 7-106622

[51] Int. Cl.⁶ .................................................. H04N 1/56
[52] U.S. Cl. ........................ 358/514; 358/516; 358/523
[58] Field of Search ................................... 358/513, 504, 358/514, 515, 516, 523; 348/223, 265

[56] References Cited

U.S. PATENT DOCUMENTS

| 4,731,661 | 3/1988 | Nagano | 358/516 |
| 4,809,061 | 2/1989 | Suzuki | 358/514 |
| 4,814,864 | 3/1989 | Pritchard | 348/227 |

FOREIGN PATENT DOCUMENTS

| 168818 | 1/1986 | European Pat. Off. . |
| 302230 | 2/1989 | European Pat. Off. . |
| 392782 | 10/1990 | European Pat. Off. . |
| 594447 | 4/1994 | European Pat. Off. . |
| 53-98721 | 8/1978 | Japan . |
| 60-236569 | 11/1985 | Japan . |
| 60-236570 | 11/1985 | Japan . |
| 5-75798 | 3/1993 | Japan . |
| 5-328040 | 12/1993 | Japan . |

*Primary Examiner*—Kim Yen Vu
*Attorney, Agent, or Firm*—Ostrolenk, Faber, Gerb & Soffen, LLP

[57] ABSTRACT

An image reading apparatus compensates inter-deviations of and a change in a color temperature of a light source while compensating a difference in the sensitivities between linear image sensors and a change in the sensitivity difference. Three linear image sensors for R, G and B of a multi-line linear image sensor read white reference image data, and a line memory stores the image data. A CPU controls an output state of each second timing signal within a timing generator line by line and independently of a first timing signal, in such a manner that peak values of the white reference image data for three lines stored in the line memory each belong to a predetermined appropriate range. This optimizes a charge accumulating time within each linear image sensor, whereby an RGB balance becomes even at an output side of each linear image sensor.

20 Claims, 6 Drawing Sheets

F I G . 7
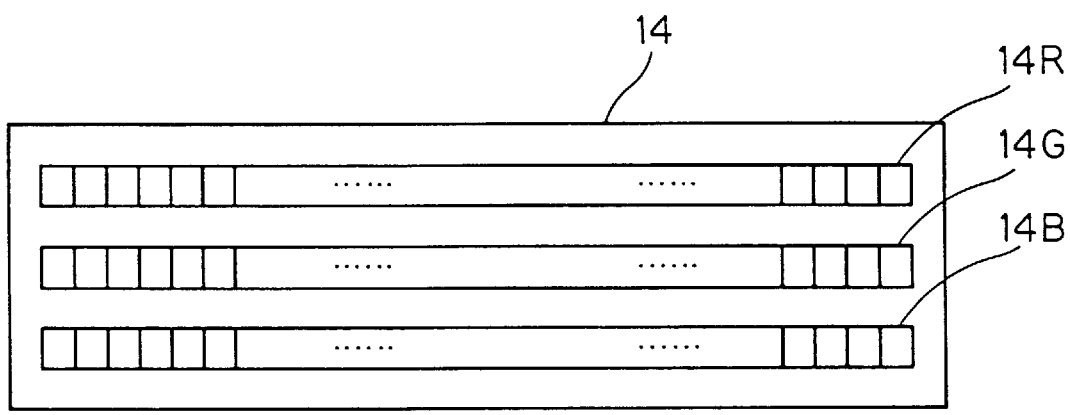

IMAGE READING APPARATUS

BACKGROUND OF THE INVENTION

1. Field of the Invention

The present invention relates to an image reading apparatus, and more particularly, to an image reading apparatus which compensates inter-deviations of an RGB balance which is created when a linear image sensor which comprises three linear image sensors for R, G and B successively reads scanning lines on a color original.

2. Description of the Background Art

As well known, in an image reading apparatus, such as a color process scanner for manufacturing a plate, which digitally reads an image, three linear image sensors are disposed parallel to each other in correspondence to optical color components of red, green and blue (hereinafter "R," "G" and "B") which are to be read. Each linear image sensor is formed by arranging a plurality of CCD elements in a line, and a color filter (R-, G- or B-filter) is disposed on each linear image sensor. The respective linear image sensors read R-, G- and B-components of the original pixel by pixel. Based on image data or a corrected version of the image data regarding each color component which is read in this manner, a recorded image (color-separated image or reproduced color image) is generated.

There is a relative difference between the sensitivities of the R-linear image sensor, the G-linear image sensor and the B-linear image sensor. FIG. 6 is a graph showing such a difference in the sensitivities. In FIG. 6, an incident wavelength is measured along a horizontal axis and a relative sensitivity (which is an output level which is obtained when light having a uniform distribution all over the visible light band range impinges upon the sensors) is measured along a vertical axis. As shown in FIG. 6, the R-linear image sensor is sensitive to light belonging to a wavelength band range of 600–700 nm, exhibiting the highest output level. The G-linear image sensor is sensitive to light belonging to a wavelength band range of 500–600 nm, exhibiting an intermediate output level. The B-linear image sensor is sensitive to light belonging to a wavelength band range of 400–500 nm, exhibiting the lowest output level. That is, the sensitivity of the R-linear image sensor is highest, and the G-linear image sensor and the B-linear image sensor have successively decreasing sensitivities in this order.

Due to such a difference in the sensitivities between the linear image sensors as described above, even when light from a light source which has no inter-deviations of the RGB balance (which is an RGB ratio) is read (that is, even when sunlight is read), the RGB balance is shifted at an output side of the sensors. Further, the inter-deviations in the RGB balance changes as the color filters which are disposed on the CCD elements deteriorate with time. In addition, there is virtually no case where an image is read under natural light, in reality. Rather, in most cases, image reading is performed using an artificial light source (e.g., a halogen lamp or a fluorescent lamp). Further, since artificial light sources have different color temperatures, it is necessary to adjust the RGB balance in accordance with the color temperatures of the artificial light sources which are used. Still further, since the color temperatures of the artificial light sources change with time, it is preferable to adjust the RGB balance once again every time image reading is performed.

However, no image reading apparatus has yet been realized which compensates such inter-deviations of an RGB balance between the respective linear image sensors as described above while compensating inter-deviations (including change with time) of color temperatures of light sources which are used.

There are some conventional techniques which control a charge accumulating time of a CCD by detecting a change in the quantity of light from a light source. A first group of such conventional techniques is related to an apparatus for reading a monochrome image, and unlike the present invention, is not related to an apparatus which compensates inter-deviations of and a change in color balances of a light source and each linear image sensor. In short, the respective conventional techniques detect only the brightness (luminance) of a light source and control a charge accumulating time of a CCD based on a detected change in the brightness. A second group of the conventional techniques uses means (specifically, a photodiode) for detecting a change in the quantity of light, in addition to CCDs, which makes the structure complex.

SUMMARY OF THE INVENTION

The present invention is directed to a color image reader.

According to the present invention, the color image reader comprises a) a plurality of linear image sensors for reading a color image to generate a plurality of color component signals representative of respective color components of the color image, respectively, b) timing generator means for generating a plurality of timing signals for determining respective time periods in which the plurality of linear image sensors are enabled, respectively, c) means for enabling the plurality of linear image sensors to read a reference color image to obtain a plurality of reference color component signals, and d) feedback means for controlling the respective time periods such that respective levels of the reference color component signals are within a predetermined range, respectively.

The charge accumulating time is optimized within each linear image sensor, whereby the balance of a plurality of color component signals becomes uniform at an output side of each linear image sensor.

In an aspect of the present invention, the color image reader further comprises e) means for relatively moving the plurality of linear image sensors and the color image to thereby scan the color image for each scanning line, f) means for generating a start timing signal for defining a start timing of reading each scanning line, wherein the feedback means is operable to control the respective time periods independently of the start timing signal.

The present invention is also directed to a method of compensating the photo-sensitivities of a plurality of linear image sensors included in a color image reader for reading respective color components of a color image.

According to the present invention, the method comprises the steps of a) generating a plurality of timing signals for determining respective time periods in which the plurality of linear image sensors are enabled, respectively, b) transmitting the plurality of timing signals to the plurality of image sensors to read a reference color image to thereby obtain a plurality of reference color component signals, and c) controlling the respective time periods such that respective levels of the reference color component signals are within a predetermined range, respectively.

Accordingly, an object of the present invention is to provide for an image reading apparatus which compensates inter-deviations of and a change in a color temperature of a light source while compensating a difference in the sensitivities between linear image sensors and a change in the sensitivity difference.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a view showing a structure of a multi-line linear image sensor.

DESCRIPTION OF THE PREFERRED EMBODIMENTS

Figure 1:
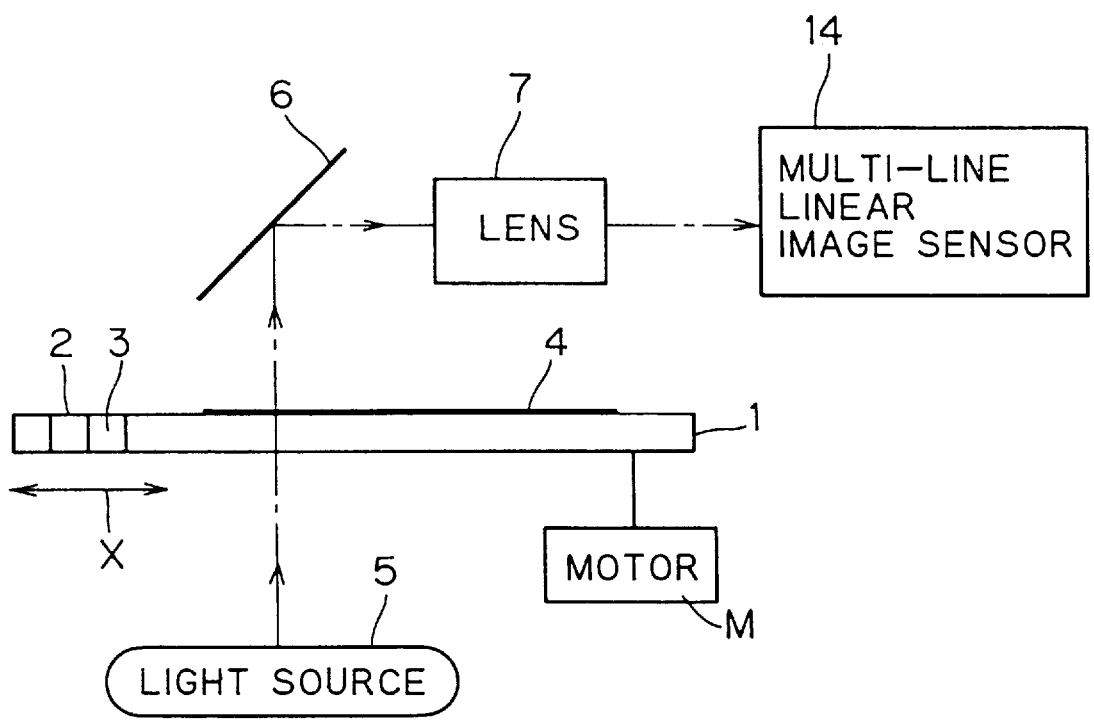
FIG. 1 is a view showing a simplified structure of an essential portion of an image reading apparatus according to a preferred embodiment of the present invention.

FIG. 1 is a view showing a simplified structure of an essential portion of an image reading apparatus according to a preferred embodiment of the present invention. In FIG. 1, a motor M is connected to an original table 1 so that the original table 1 is movable in a direction X. A black reference board 2 and a white reference board 3 are disposed in the vicinity of one of the edges of the original table 1. The black reference board 2 and the white reference board 3 are read before reading an original, to thereby perform various types of correction. An original 4 to be read is mounted on the original table 1. Light from a light source 5 passes through the original table 1 and the original 4, and is reflected by a mirror 6 to impinge upon a lens 7. The lens 7 forms an image of the original 4 on a reading surface of a multi-line linear image sensor 14. The multi-line linear image sensor 14 successively reads the image of the original 4, scanning line by scanning line, as the original table 1 moves. Hence, the longitudinal direction of the multi-line linear image sensor 14 is a main scanning direction, and the direction in which the original table 1 moves is a sub scanning direction.

Figure 2:
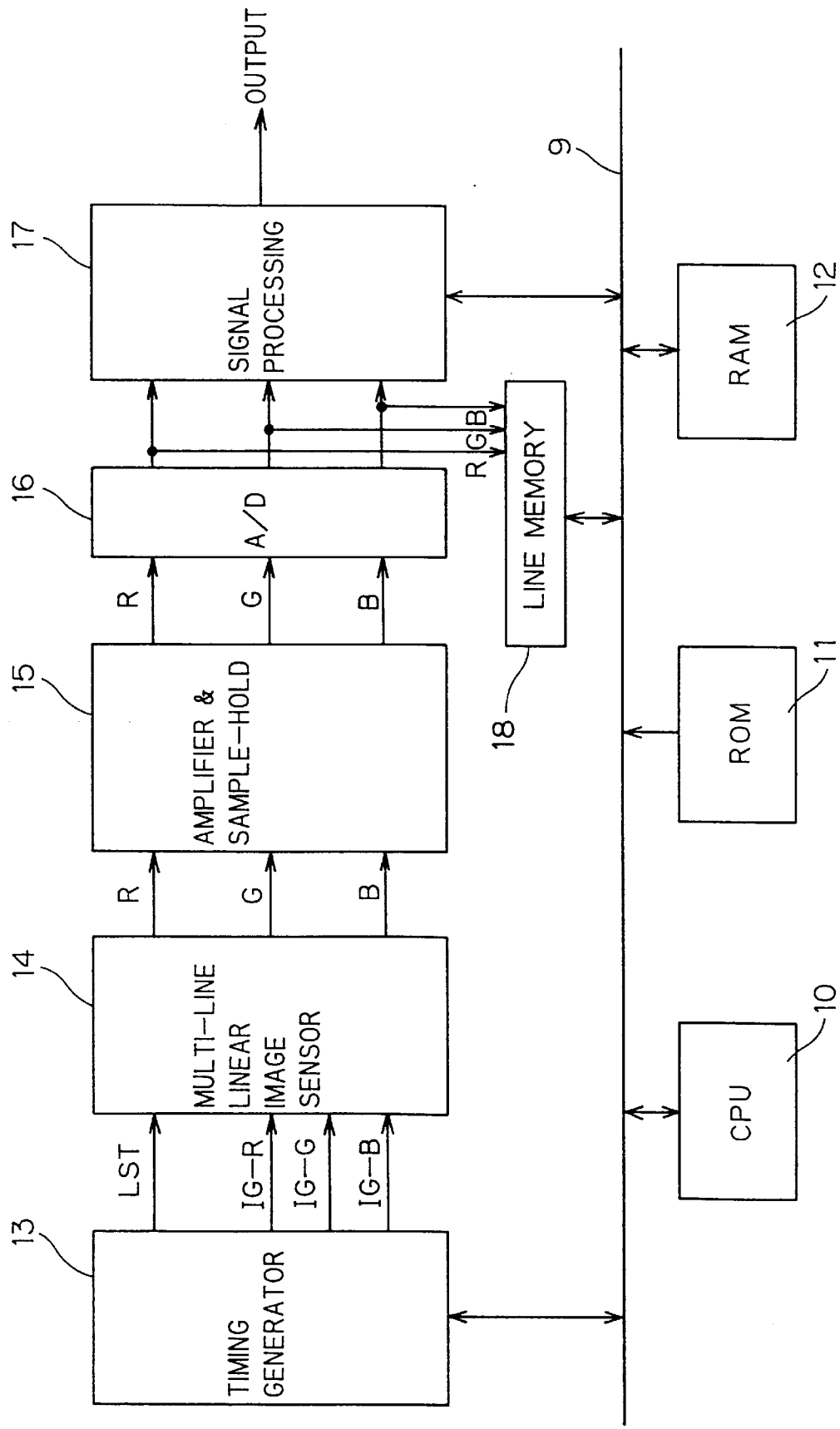
FIG. 2 is a block diagram showing an electric structure according to the preferred embodiment shown in FIG. 1.

FIG. 2 is a block diagram showing an electric structure according to the preferred embodiment shown in FIG. 1. In FIG. 2, the image reading apparatus comprises a CPU bus 9, a CPU 10, a ROM 11, a RAM 12, a timing generator 13, the multi-line linear image sensor 14, an amplifying & sample hold circuit 15, an A/D convertor 16, a signal processing circuit 17, and a line memory 18.

The CPU 10, the ROM 11, and the RAM 12 are connected to the CPU bus 9. The ROM 11 stores an operation program for the CPU 10 and a proper level of each linear image sensor for the purpose of correcting an RGB balance. Hence, the CPU 10 operates according to the operation program which is stored in the ROM 11 and controls the respective circuits which are connected to the CPU bus 9. The RAM 12 serves as a working memory, storing various types of data which are necessary for the CPU 10 to process data.

The timing generator 13 is also connected to the CPU bus 9. The timing generator 13 generates four types of timing signals LST, IG-R, IG-G, and IG-B, in response to an instruction from the CPU 10. These timing signals are supplied to the multi-line linear image sensor 14. As shown in FIG. 7, the multi-line linear image sensor 14 includes three linear image sensors which extend in the main scanning direction, i.e., an R-linear image sensor 14R, a G-linear image sensor 14G and a B-linear image sensor 14B. The linear image sensors are each formed by arranging a plurality of CCD elements for R, G and B, respectively, in a line.

Figure 3:
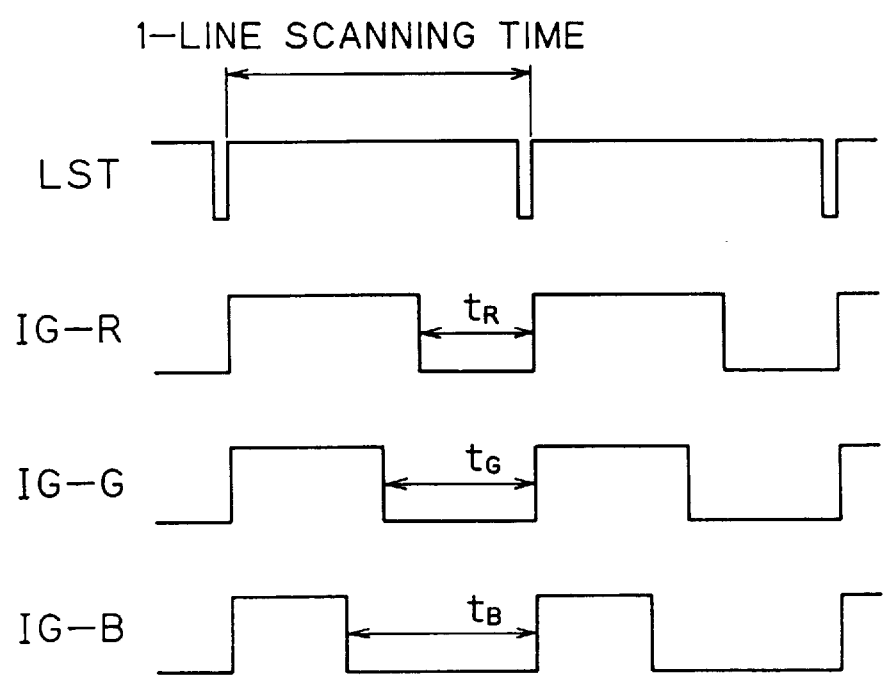
FIG. 3 is a timing chart showing timing signals LST, IG-R, IG-G, and IG-B which are generated by a timing generator of FIG. 2.

FIG. 3 is a timing chart showing the timing signals LST, IG-R, IG-G, and IG-B. In FIG. 3, the timing signal LST (start timing signal) is a signal which is commonly supplied to the respective linear image sensors to define a 1-line scanning time and a start timing of reading each scanning line. On the other hand, the timing signals IG-R, IG-G, and IG-B are pulse signals and supplied respectively to the R-linear image sensor, the G-linear image sensor and the B-linear image sensor, independently of each other, to define a charge accumulating time of each linear image sensor. In short, the timing signals IG-R, IG-G and IG-B are activated at a first time and deactivated at a second time. The first time is different among those three timing signals, while the second time is common to those three timing signals. As a result, the R-, the G-, and the B-linear image sensors convert light from the lens 7 into electric charges and accumulate the electric charges, within periods $t_R$, $t_G$ and $t_B$ which are defined respectively by the timing signals IG-R, IG-G, and IG-B.

After amplified and processed by sample-holding in the amplifier & sample hold circuit 15, three primary color signals R, G and B outputted from the multi-line linear image sensor 14 are supplied to the A/D convertor 16, and converted into three digital primary color signals. The three digital primary color signals are supplied to the signal processing circuit 17 and the line memory 18. The signal processing circuit 17, in cooperation with the CPU 10, performs known shading correction, γ-correction, etc. An output signal from the image reading apparatus is available from the signal processing circuit 17. The line memory 18 includes memories for three lines, and stores the three digital primary color signals separately from each other. The three digital primary color signals which are stored in the line memory 18 are referred to by the CPU 10 and used to correct the RGB balance.

Figure 4:
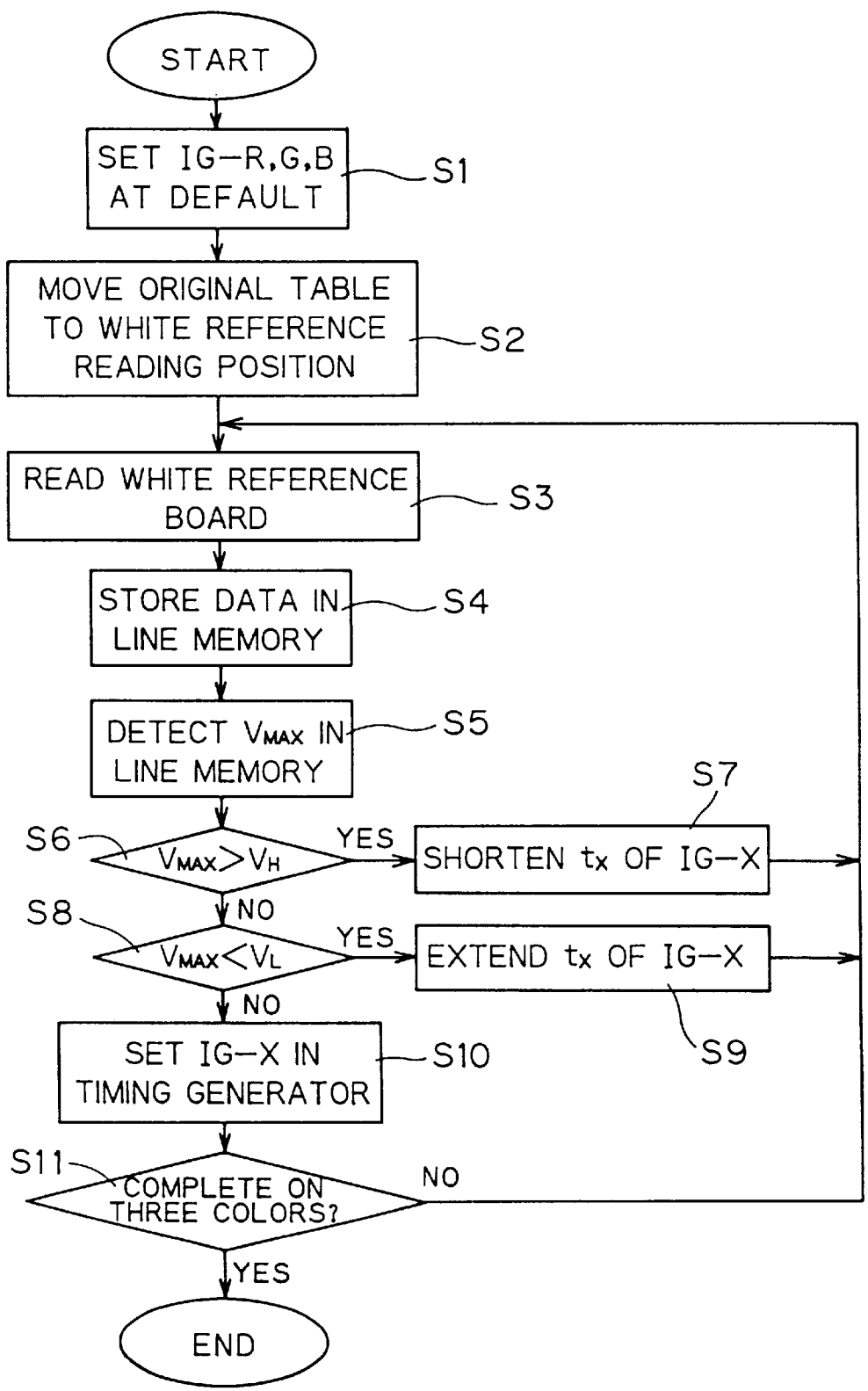
FIG. 4 is a flow chart showing an operation of the image reading apparatus of FIG. 1.
Figure 5:
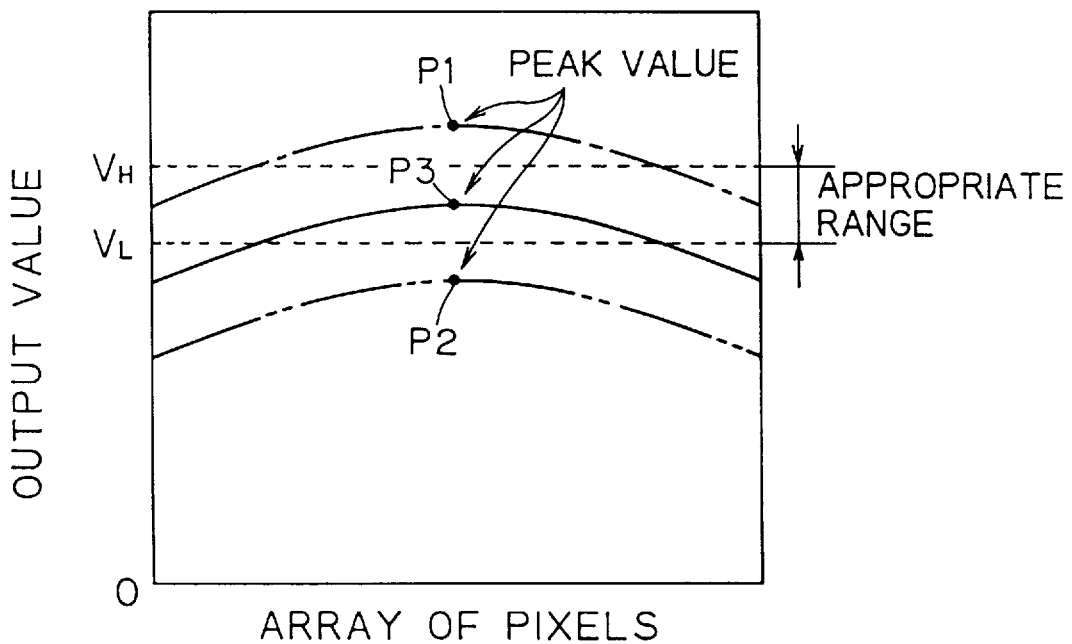
FIG. 5 is a graph showing output values from CCD elements of the respective linear image sensors of a multi-line linear image sensor shown in FIG. 2.
Figure 6:
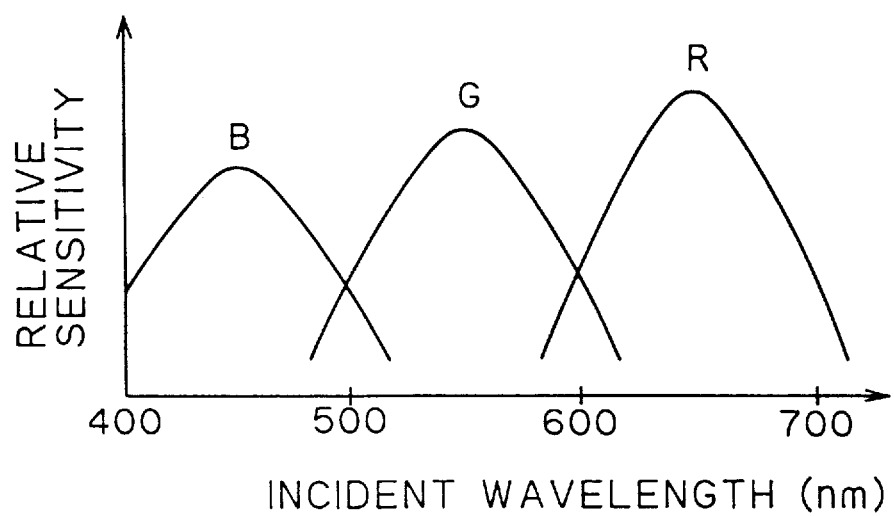
FIG. 6 is a graph showing a difference in the sensitivities between the respective linear image sensors of the RGB three primary colors.

FIG. 4 is a flow chart showing an operation of the image reading apparatus of FIG. 1, and FIG. 5 is a graph showing output values from the CCD elements of the respective linear image sensors of the multi-line linear image sensor 14. In the following, an operation according to the preferred embodiment will be described with reference to FIGS. 4 and 5. First, the CPU 10 sets the low level periods $t_R$, $t_G$ and $t_B$ of the timing signals IG-R, IG-G, and IG-B which are generated by the timing generator 13 (see FIG. 3) at default values which are stored in the apparatus in advance (e.g., within the ROM 11) (Step S1). Although the default values may be any values in principle, the default values are preferably values which are selected considering inter-deviations of the RGB balance on the linear image sensor side. Since this allows each linear image sensor to output an output value which is close to the appropriate range from the beginning, it is possible to complete correction of the charge accumulating times which will follow later, within a short period of time.

Next, the CPU 10 moves the original table 1 to a position at which the multi-line linear image sensor 14 can read the white reference board 3 (Step S2). Hence, the multi-line linear image sensor 14 reads the white reference board 3 (Step S3). Image data of the white reference board 3 which is read by the multi-line linear image sensor 14 is converted into three digital primary color signals and then temporarily stored in the line memory 18 (Step S4). Next, the CPU 10 selects a digital color signal for one line from digital signals for three lines which are stored in the line memory 18, compares output levels associated with the respective pixels included in the selected color signal, and detects a peak value $V_{MAX}$ (See FIG. 5) (Step S5).

The ROM 11 stores an upper limit value $V_H$ and a lower limit value $V_L$ which define the appropriate range as that shown in FIG. 5. In the present embodiment, the charge accumulating time of a CCD of each linear image sensor is corrected until the peak value $V_{MAX}$ enters the appropriate range. The appropriate range is selected as high as possible but so as not to allow saturation of CCD output from each linear image sensor. Hence, it is possible to increase accumulated charges and a S/N ratio of an image reading signal. If the appropriate range is selected as a saturation region, blooming, i.e., a phenomena in which excessive charges are transferred to adjacent CCDs, is created to thereby deteriorate the S/N ratio.

Following this, the CPU 10 judges whether the peak value $V_{MAX}$ is over the upper limit value $V_H$ (Step S6). If the peak value $V_{MAX}$ is over the upper limit value $V_H$ (i.e., in the case of P1 in FIG. 5), the CPU 10 instructs the timing generator 13 to shorten a low level period $t_X$ ($t_X=t_R$, $t_G$ or $t_B$) of the timing signal IG-X (IG-R, IG-G, or IG-B) by a predetermined period of time (Step S7). This shortening is done by changing the first timing of the timing signal without changing the second timing. This shortens the charge accumulating time of the CCDs of the associated linear image sensor, and hence decreases the output value from this linear image sensor. As a result, the peak value $V_{MAX}$ is decreased. Next, the CPU 10 returns to the operation at Step S3 to adjust the low level period $t_X$ of the timing signal IG-X, in accordance with the data which is read from the white reference board 3.

At Step S6, if the peak value $V_{MAX}$ is not over the upper limit value $V_H$, the CPU 10 judges whether the peak value $V_{MAX}$ is lower than the lower limit value $V_L$ (Step S8). If the peak value $V_{MAX}$ is lower than the lower limit value $V_L$ (i.e., in the case of P2 in FIG. 5), the CPU 10 instructs the timing generator 13 to extend the low level period $t_X$ of the timing signal IG-X by a predetermined period of time (Step S9). This extends the charge accumulating time of the CCDs of the associated linear image sensor, and hence increases the output value from this linear image sensor. As a result, the peak value $V_{MAX}$ is increased. Next, the CPU 10 returns to the operation at Step S3 to adjust the low level period $T_X$ of the timing signal IG-X in accordance with the data which is read from the white reference board 3.

The operations from Step S3 to Step S9 are repeated, whereby the peak value $V_{MAX}$ gradually becomes close to the appropriate range. Once the peak value $V_{MAX}$ enters the appropriate range, the following relationships are satisfied:

$$V_{MAX} \leq V_H$$

and $$V_{MAX} \geq V_L$$

so that the CPU 10 sets the low level period $t_X$ of the timing signal IG-X at this stage within the timing generator 13, as a final result of correction (Step S10).

Next, the CPU 10 judges whether such correction as above of the charge accumulating time is complete for every linear image sensor which is included in the multi-line linear image sensor 14 (Step S11). If there is a linear image sensor on which such correction is not complete yet, the CPU 10 returns to the operation at Step S3 to repeat the series of correction operations described above. The CPU 10 finishes operating upon completion of correction on all linear image sensors.

While the invention has been described in detail, the foregoing description is in all aspects illustrative and not restrictive. It is understood that numerous other modifications and variations can be devised without departing from the scope of the invention.

I claim:

1. A color image reader comprising:

a) a memory for storing an upper limit value $V_H$ and a lower limit value $V_L$, wherein $V_H$ and $V_L$ define a predetermined range;

b) a plurality of linear image sensors for reading a color image, each linear image sensor generating a color component signal representative of a color component of said color image;

c) an enabling timing signal generator generating a plurality of enabling timing signals, each enabling timing signal corresponding to one of said plurality of linear image sensors and indicating enabled time periods during which said corresponding linear image sensor is enabled;

d) a reference image reader causing said plurality of linear image sensors to read at least one reference color board to obtain a reference color component signal for each linear image sensor; and e) an enabling timing signal controller controlling each of said enabling timing signals such that a level of each of said reference color component signals is within said predetermined range.

2. The color image reader of claim 1, further comprising:

e) a relative movement device which moves said plurality of linear image sensors and said color image relative to one another to thereby read a plurality of scanning lines of said color image; and f) a start timing signal generator defining a start time for reading each scanning line;

wherein said enabling timing signal controller controls said enabling timing signals independently of said start timing signal.

3. The color image reader of claim 2, wherein said predetermined range is determined so as to compensate inter-deviations of photo-electric sensitivities among said plurality of linear image sensors.

4. The color image reader of claim 3, wherein each of said enabling timing signals are pulse signals which are activated at a first time and deactivated at a second time, said first times being different among said plurality of enabling timing signals, while said second times are common among said plurality of enabling timing signals, and said enabling timing signal controller includes:

d-1) a first time changer relatively changing said first times of said plurality of enabling timing signals without changing said second times.

5. The color image reader of claim 4, wherein said color components are blue, green and red components, and said reference color board is a white reference board.

6. The color image reader of claim 5, wherein each of said plurality of linear image sensors includes:

a-1) a linear array of charge coupled devices, and said enabled time periods are time periods during which said linear arrays of charge coupled devices are charged in response to densities of said respective color components.

7. The color image reader of claim 1, wherein said enabling signal timing generator generates default enabling timing signals indicating enabled time periods having a duration which is a function of inter-deviations of color balance among said plurality of linear image sensors.

8. The color image reader of claim 7, wherein said color components are blue, green and red components.

9. The color image reader of claim 8, wherein said duration of said enabled time periods indicated by said enabling timing signal corresponding to said linear image sensor generating said blue color component is longer than said duration of said enabled time periods indicated by said enabling timing signal corresponding to said linear image sensor generating said green color component, and wherein said duration of said enabled time periods indicated by enabling timing signal corresponding to said linear image sensor generating said green color component is longer than said duration of said enabled time periods indicated by said enabling timing signal corresponding to said linear image sensor generating said red color component.

10. A method of compensating photosensitivities of a plurality of linear image sensors in a color image reader, each linear image sensor reading a respective color component of a color image, the method comprising the steps of:

a) storing an upper limit value $V_H$ and a lower limit value $V_L$, wherein $V_H$ and $V_L$ define a predetermined range;

b) generating a plurality of enabling timing signals, each enabling timing signal corresponding to one of said plurality of linear image sensors and indicating enabled time periods during which said corresponding linear image sensor is enabled;

c) reading at least one reference color board with each of said linear image sensors to thereby obtain a reference color component signal for each linear image sensor, and d) controlling each of said enabling timing signals such that a level of each of said reference color component signals is within said predetermined range.

11. The method of claim 10, wherein said color image reader is operable to read a plurality of scanning lines of said color image, the method further comprising the step of:

d) generating a start timing signal defining a start time for reading each scanning line, and wherein said step c) includes the step of:

c-1) controlling said enabling timing signals independently of said start timing signal.

12. The method of claim 11, wherein said predetermined range is determined so as to compensate inter-deviations of photo-electric sensitivities among said plurality of linear image sensors.

13. The method of claim 12, wherein each of said enabling timing signals are pulse signals which are activated at a first time and deactivated at a second time, said first times being different among said plurality of enabling timing signals, while said second times are common among said plurality of enabling timing signals, and said step c-1) includes the step of:

relatively changing said first times of said plurality of enabling timing signals without changing said second times.

14. The method of claim 13, wherein said color components are blue, green and red components, and said reference color board is a white reference board.

15. The method of claim 14, wherein each of said plurality of linear image sensors includes a linear array of charge coupled devices, and said enabled time periods are time periods during which said linear arrays of charge coupled devices are charged in response to densities of said respective color components.

16. The method of claim 10, further comprising generating default enabling timing signals indicating enabled time periods having a duration which is a function of inter-deviations of color balance among said plurality of linear image sensors.

17. The method of claim 16, wherein said color components are blue, green and red components.

18. The method of claim 17, wherein said duration of said enabled time periods indicated by said enabling timing signal corresponding to said linear image sensor generating said blue color component is longer than said duration of said enabled time periods indicated by said enabling timing signal corresponding to said linear image sensor generating said green color component, and wherein said duration of said enabled time periods indicated by enabling timing signal corresponding to said linear image sensor generating said green color component is longer than said duration of said enabled time periods indicated by said enabling timing signal corresponding to said linear image sensor generating said red color component.

19. A color image reader comprising:

a) a memory for storing an upper limit value $V_H$ and a lower limit value $V_L$, wherein $V_H$ and $V_L$ define a predetermined range;

b) a plurality of linear image sensors for reading a color image, each linear image sensor generating a color component signal representative of a color component of said color image;

c) a reference image reader causing said plurality of linear image sensors to read a reference color board to obtain a reference color component signal for each linear image sensor; and d) a linear image sensor controller controlling each of said linear image sensors such that a peak value of said reference color component signals of said corresponding linear image sensors is within said predetermined range.

20. A method of compensating photo-sensitivies of a plurality of linear image sensors in a color image reader, each linear image sensor reading a respective color component of a color image, the method comprising the steps of:

a) storing an upper limit value $V_H$ and a lower limit value $V_L$, wherein $V_H$ and $V_L$ define a predetermined range;

b) reading a reference color board with each of said linear image sensors to thereby obtain a reference color component signal for each linear image sensor; and c) controlling each of said linear image sensors such that a peak value of said reference color component signals of said corresponding linear image sensors is within said predetermined range.

* * * * *